(12) United States Patent  (10) Patent No.: US 9,471,766 B2
Jin  (45) Date of Patent: Oct. 18, 2016

(54) SCREEN UNLOCKING METHOD AND SYSTEM BASED ON MOBILE TERMINAL, AND STORAGE MEDIUM FOR THE SAME (71) Applicant: HUIZHOU TCL MOBILE COMMUNICATION CO. LTD., HuiZhou, Guangdong (CN)

(72) Inventor: Xin Jin, HuiZhou (CN)

(73) Assignee: HUIZHOU TCL MOBILE COMMUNICATION CO. LTD., Huizhou, Guangdong (CN)

( * ) Notice: Subject to any disclaimer, the term of this patent is extended or adjusted under 35 U.S.C. 154(b) by 0 days.

(21) Appl. No.: 14/417,061

(22) PCT Filed: Aug. 12, 2013

(86) PCT No.: PCT/CN2013/081315
§ 371 (c)(1),
(2) Date: Jan. 23, 2015

(87) PCT Pub. No.: WO2014/146391
PCT Pub. Date: Sep. 25, 2014

(65) Prior Publication Data
US 2015/0213249 A1  Jul. 30, 2015

(30) Foreign Application Priority Data
Mar. 21, 2013 (CN) .......................... 2013 1 0091905

(51) Int. Cl.
*H04W 12/08* (2009.01)
*G06F 21/36* (2013.01)
(Continued)

(52) U.S. Cl.
CPC ............. *G06F 21/36* (2013.01); *G06F 3/0488* (2013.01); *G06F 3/04886* (2013.01); *H04L 63/168* (2013.01); *H04W 12/06* (2013.01); *H04W 12/08* (2013.01)

(58) Field of Classification Search
CPC ... H04W 12/08; H04W 12/06; G06F 3/0488; G06F 21/36
USPC .......................... 455/410, 411, 414.1, 414.4
See application file for complete search history.

(56) References Cited

U.S. PATENT DOCUMENTS 8,587,551 B2  11/2013  Whytock
2011/0105193 A1  5/2011  Lee et al.
(Continued)

FOREIGN PATENT DOCUMENTS

CN  101853130  10/2010
CN  101986251 A  3/2011
(Continued)

OTHER PUBLICATIONS

International Search Report for PCT/CN2013/081315 mailed on Jan. 2, 2014.

*Primary Examiner* — Sam Bhattacharya
(74) *Attorney, Agent, or Firm* — Hauptman Ham, LLP (57) ABSTRACT

The method for unlocking a screen comprises the following steps: dividing a screen of a mobile terminal into M regions in advance; presetting a touch combination of N regions among the M regions of the screen as a screen unlocking combination regions, and storing the screen unlocking combination regions; receiving a user operation instruction, selecting and touching N regions combination of the mobile terminal screen as a user unlocking regions; comparing the user unlocking regions with the presetting screen unlocking combination regions to determine whether the user unlocking regions and the presetting screen unlocking combination regions are consistent, and if consistent, controlling the screen to unlock.

15 Claims, 4 Drawing Sheets (51) Int. Cl.
  *G06F 3/0488* (2013.01)
  *H04L 29/06* (2006.01)
  *H04W 12/06* (2009.01)

(56) References Cited

U.S. PATENT DOCUMENTS

2013/0234971 A1  9/2013  Li
2015/0045001 A1* 2/2015  Song .................. G06F 3/017
                                              455/411

FOREIGN PATENT DOCUMENTS

| | | | |
|---|---|---|---|
| CN | 102236527 A | 11/2011 | |
| CN | 102455839 A | 5/2012 | |
| CN | 102566861 A | 7/2012 | |
| CN | 102609204 A | 7/2012 | |
| CN | 102799336 | 11/2012 | |
| CN | 102799363 A | 11/2012 | |
| CN | 102799387 A | 11/2012 | |
| CN | 102880398 A | 1/2013 | |
| CN | 102984349 A | 3/2013 | |
| CN | 103092519 A | 5/2013 | |
| CN | 103164161 | 6/2013 | |
| EP | 2280363 | 2/2011 | |

\* cited by examiner

SCREEN UNLOCKING METHOD AND SYSTEM BASED ON MOBILE TERMINAL, AND STORAGE MEDIUM FOR THE SAME

CROSS REFERENCE TO RELATED APPLICATION

This application claims the priority of International Application No. PCT/CN2013/081315, filed on Aug. 12, 2013, which claims priority to Chinese Application No. 201310091905.X, filed on Mar. 21, 2013. The entire disclosures of each of the above applications are incorporated herein by reference.

TECHNICAL FIELD OF THE INVENTION

The present invention relates to a mobile terminal with a large screen, and more particularly to a unlocking a screen method and system based on the mobile terminal, as well as a storage medium for the same.

BACKGROUND OF THE INVENTION

The mobile phone is an extremely popular communication device. Over the years, the smart phone has gradually become the mainstream among mobile phones. Every manufacturer considers the issue of unlocking manners of a smart phone with a large screen. Nevertheless, an easy unlocking manner is more convenient for the user.

The prior art for the unlocking method is generally a slide to unlock or keying a password to unlock. These methods are unable to meet the personalized requirements of the user. The, unlocking passwords are easily cracked, and therefore are disadvantageous for protecting the user's personal information.

SUMMARY OF THE INVENTION

The present invention aims to solve the aforementioned technical problems arising from the foregoing deficiencies in the prior art by providing a screen unlocking method and system based on mobile terminal, and storage medium for the same for easily and quacking unlocking a large screen of the mobile terminal, and therefore is convenient for the user to use.

The present invention provide a technical solution for solving the above technical problems by providing a screen unlocking method based on a mobile terminal, the method comprises steps of:

receiving a region dividing instruction, and dividing a screen of a mobile terminal into M regions according to the region dividing instruction, wherein M is an integer greater than 1;

receiving a region setting instruction, and setting N regions among the M regions of the screen as screen unlocking combination regions according to the region setting instruction, and storing the screen unlocking combination regions, wherein N is an integer greater than 0 and less than M, where the screen unlocking combination regions includes a region set sequence of the screen unlocking combination regions being not selected in order, a region set sequence of the screen unlocking combination regions being selected in order;

receiving a user operation instruction, and selecting N regions of the screen as user unlocking regions according to the user operation instruction;

comparing the user unlocking regions with the screen unlocking combination regions to obtain a comparison result; and executing an unlocking operation to the screen if the comparison result is that the user unlocking regions and the screen unlocking combination regions are consistent.

In addition, a screen unlocking system based on a mobile terminal is provided, the system comprises:

a region dividing module for receiving a region dividing instruction and dividing a screen into M regions according to the region dividing instruction, wherein M is an integer greater than 1;

an unlocking setting module for receiving a region setting instruction, setting N regions among the M regions of the screen as screen unlocking combination regions according to the region setting instruction, and storing the screen unlocking combination regions, wherein N is an integer greater than 0 and less than M, where the screen unlocking combination regions includes a region set sequence of the screen unlocking combination regions being not selected in order, a region set sequence of the screen unlocking combination regions being selected in order;

a receiving module for receiving a user operation instruction, and selecting N regions of the screen as user unlocking regions according to the user operation instruction;

a comparison module for comparing the user unlocking regions with the screen unlocking combination regions to obtain a comparison result; and an unlocking control module for executing an unlocking operation to the screen if the comparison result is that the user unlocking regions and the screen unlocking combination regions are consistent.

Furthermore, a screen unlocking storage medium based on a mobile terminal is provided, having stored thereon instructions being executed by a processor, the processor executing said instructions provides a method for unlocking a screen configured to a mobile terminal, comprising:

receiving an region dividing instruction, and dividing a screen into M regions according to the region dividing instruction, wherein M is an integer and greater than 1;

receiving an region setting instruction, and setting N regions among the M regions of the screen as the screen unlocking combination regions according to the region, and storing the screen unlocking combination regions, wherein N is an integer greater than 0 and less than M, where the screen unlocking combination regions includes a region set sequence of the screen unlocking combination regions being not selected in order, a region set sequence of the screen unlocking combination regions being selected in order;

receiving a user operation instruction, and selecting N regions of the screen as a user unlocking regions according to the user operation instruction;

comparing the user unlocking region with the screen unlocking combination regions to obtain the comparison result; and executing an unlocking operation to the screen if the comparison result is that the user unlocking regions and the screen unlocking combination regions are consistent.

The present invention relates to a screen unlocking method and system based on mobile terminal, and storage medium for the same. According to a finger touch position which is sensed by screen, a screen of a mobile terminal is divided into M regions in advance; a combination of N regions is set in the divided regions as a screen unlocking combination regions. The divided M regions and the screen unlocking combination regions are self-defined parameters. Therefore, a user may set multiple unlocking combinations, so as to meet the personalized requirements of a user for unlocking a screen, avoid an incorrect touch screen unlocking operation, and prevent unauthorized users from easily unlocking the screen, thereby preserving the user's personal interests, improving the screen unlocking security, and providing convenience for the user.

DETAILED DESCRIPTION OF THE INVENTION

In order to further clarify the purposes, technical solutions, and advantages of the present invention, the present invention will be described in further detail by referring to the appending drawings and embodiments. It should be appreciated that the specific embodiments described herein are only to illustrate the present invention, but are not intended to limit the scope of the present invention.

Figure 1:
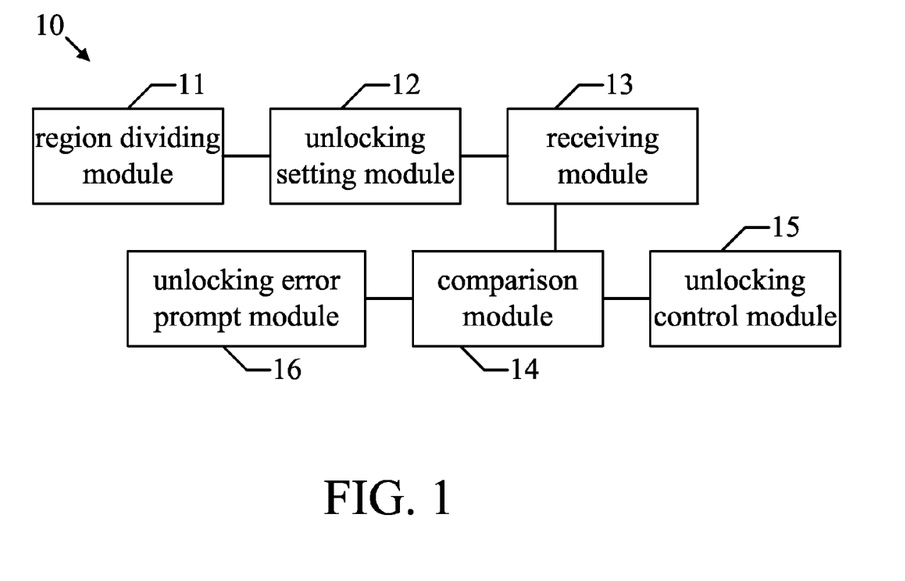
FIG. 1 is a structural schematic diagram of a preferred embodiment of the present invention.

Please refer to FIG. 1, which is a structural schematic diagram of the preferred embodiment of the present invention. The mobile terminal includes, but is not limited to, hand held or laptop devices, mobile devices (such as mobile phones, personal digital assistants (PDA), media players, and the like), multi-processor systems, consumer electronic devices comprising the distributed computing environment for any of the above systems or devices, etc.

In the present preferred embodiment, the screen unlocking system 10 comprises a region dividing module 11, an unlocking setting module 12, a receiving module 13, a comparison module 14, an unlocking control module 15, and an unlocking error prompting module 16. The region dividing module 11 is used for receiving an region dividing instruction, and dividing instruction a screen is divided to M regions according to the region dividing instruction, wherein M is an integer greater than 1. The unlocking setting module 12 is used for receiving an region setting instruction, and setting N regions among the M regions of the screen as screen unlocking combination regions according to the region setting instruction. The screen unlocking combination regions are stored. The number N is an integer greater than 0 and less than M. The receiving module 13 is used for receiving a user operation instruction, and selecting N regions of the screen as user unlocking regions according to the user operation instruction. The comparison module 14 is used for comparing the user unlocking regions with the screen unlocking combination regions to obtain a comparison result. The unlocking control module 15 is used for executing the screen unlocking operation if the comparison result is that the user unlocking regions and the screen unlocking combination regions are consistent. The unlocking error prompt module 16 is used providing a prompt stating that unlocking is failed if the comparison result is that the user unlocking regions and the screen unlocking combination regions are not consistent.

Preferably, the unlocking setting module 12 stores a region setting sequence of the screen unlocking combination regions; and the comparison module 14 is used to compare the user unlocking regions with the screen unlocking combination regions, and to compare the selected sequence of the user unlocking regions with the region setting sequence of the screen unlocking combination regions to obtain the comparison result. If the comparison result is that the user unlocking regions and the screen unlocking combination regions are consistent, and the selected sequence and the region setting sequence are consistent, then the unlocking control module 15 unlocks the screen. If either the comparison result is that the user unlocking region and the screen unlocking combination regions are inconsistent, or the selected sequence and the region setting sequence are inconsistent, then the unlocking error prompt module 16 prompts that unlocking is failed.

If the user's operation instruction is not received within a predetermined period, then the receiving module 13 selects the latest selected N regions of the screen as the user unlocking regions.

Preferably, the region dividing module divides the screen into M regions, and the M regions are configured into X rows from left to right, and into Y columns from top to bottom; M=X*Y, X and Y respectively being integers greater than 1. When M is 25, the region dividing module 11 divides the screen into 25 regions, and the 25 regions are configured into 5 rows from left to right, and into 5 columns from top to bottom.

The operation principles of the preferred embodiment of the screen unlocking system based on the mobile terminal are described with reference to the preferred embodiment of the screen unlocking method based on the mobile terminal as below.

Figure 2:
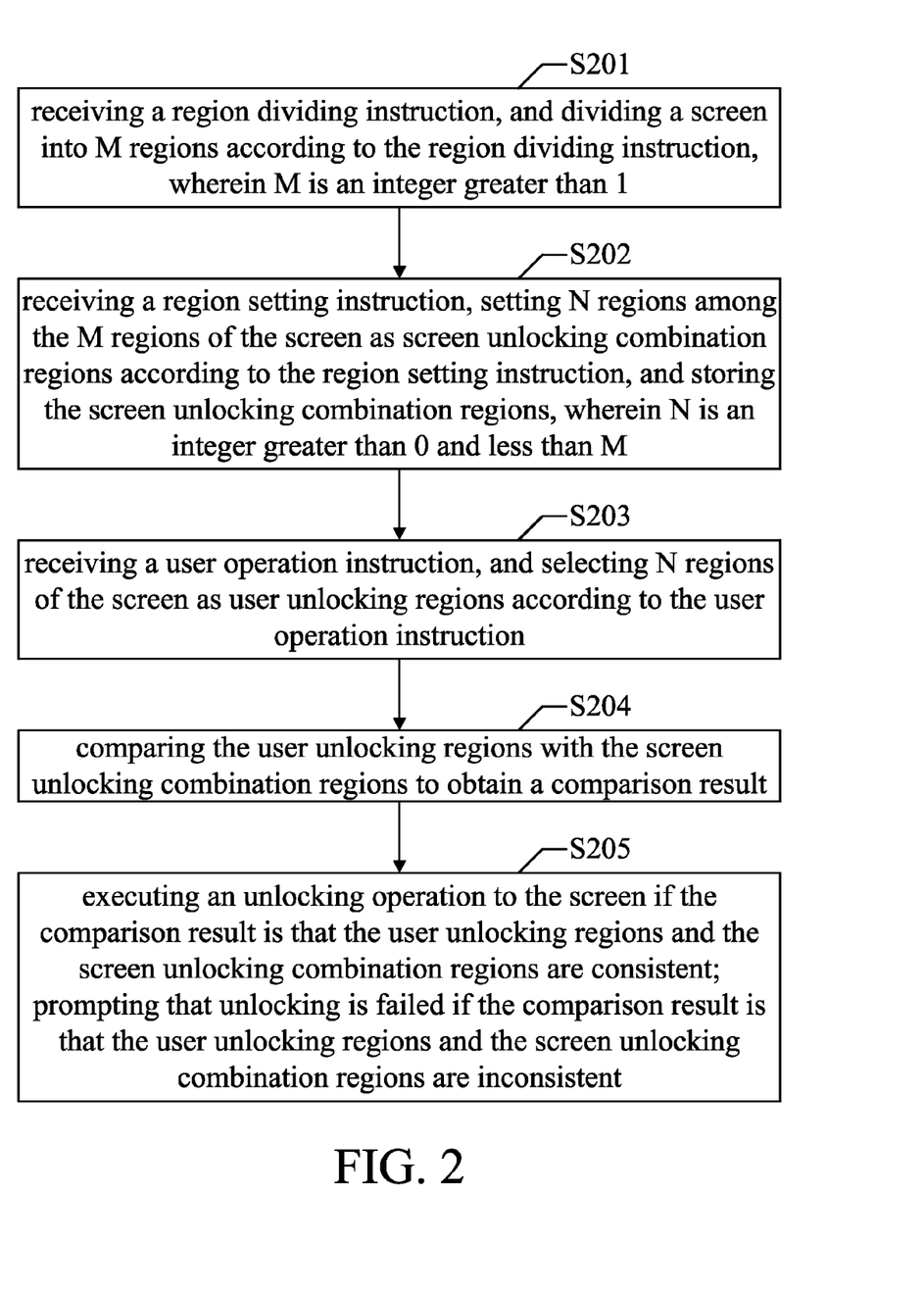
FIG. 2 is a flow chart of a preferred embodiment of the present invention.

Please refer to FIG. 1 and FIG. 2. FIG. 2 is a flow chart of the referred embodiment of the screen unlocking method based on the mobile terminal of the present invention. The screen unlocking method of the preferred embodiment comprises:

Step S201, receiving an region dividing instruction, and dividing a screen into M regions according to the region dividing instruction, wherein M is an integer greater than 1.

Taking a smart phone with a large screen as an example, when the present invention is implemented, first, a user lights the mobile phone screen and then the user performs the operation of the mobile terminal (i.e., the user issues the region dividing instruction), inputs the setting of a screen unlocking manner, that is, the screen of the mobile terminal is divided into M regions by the region dividing module 11, wherein M is an integer and greater than 0; and the method enters Step S202.

Step S202, receiving an region setting instruction, and setting N regions among the M regions of the screen as screen unlocking combination regions according to the region setting instruction, and storing the screen unlocking combination regions, wherein N is an integer greater than 0 and less than M.

In the step S201 above, the screen unlocking manner is set to receive an region setting instruction by touching the region of the screen. Therefore, after a screen is divided into M regions, an unlocking setting module 12 then arbitrarily selects N regions from the M regions as the screen unlocking combination regions according to the region setting instruction and stores the selected N regions combination, and the method enters step S203.

Step S203, receiving a user operation instruction, and selecting N regions of the screen as a user unlocking regions according to the user operation instruction selecting N regions of the screen as a user unlocking region.

According to the operation of the foregoing step S203, when the screen is in a screen locking state, after the mobile terminal receives an operation instruction from a user to illuminate the screen. the receiving module 13 receives a user operation instruction and selects N regions of the screen of the mobile terminal accordingly. The selected N regions are combined as the user unlocking regions, wherein N is an integer greater than 0 and less than M; and the method enters the next step S204.

Step S204, comparing the user unlocking regions with the screen unlocking combination regions to obtain the comparison result.

According to the operation of the foregoing step S203, in the present step, a comparison module 14 compares the user unlocking regions selected by the user with the screen unlocking combination regions in the system to obtain the comparison result; and the method enters step S205.

Step S205, executing an unlocking operation to the screen if the comparison result is that the user unlocking regions and the screen unlocking combination regions are consistent; or prompting that unlocking is failed if the comparison result is that the user unlocking regions and the screen unlocking combination regions are inconsistent.

In the present step, if the comparison result is that the user unlocking regions and the screen unlocking combination regions are consistent, then an unlocking control module 15 performs the operation of unlocking the screen; if the comparison result is that the user unlocking regions and the screen unlocking combination regions are not consistent, then the unlocking error prompt module 16 prompts that unlocking is failed, then the user operation instruction can be re-inputted.

In the present preferred embodiments, the screen unlocking method for the mobile terminal ends at step 205

Preferably, in step S203, if the user operation instruction has not been received within a predetermined period, then a receiving module 13 selects the latest selected N regions of the screen as the user unlocking regions. The predetermined period can be 1 second, 2 seconds, etc. Specifically, the system sets that a time interval for two regions that are touched successively should be within 1 second If the period from the previous selectively touched region to the next one region to be touched exceeds 1 second, then the user fails to select the Original translation 9 complete combination of the preset N regions, so as to lead to the failure of the unlocking operation, and therefore the screen cannot be unlocked. If the user does not completely touch the stored combination of preset N regions, the screen cannot be unlocked. If no region of the screen is touched after the screen is illuminated, or if the user touches other regions which are not in the combination of the preset N regions, the screen is also unable to be unlocked.

Preferably, in step S202, if the unlocking setting module 12 stores the preset combination of N regions, which are not selected in order (i.e. the unlocking setting module 12 does not store the region set sequence of the screen unlocking combination regions), in the system, then in step 204, when the comparison module 14 compares the selected combination of the N regions in the system, it is only necessary to decide whether the selected N regions are completely the same as the stored preset combination of the N regions or not. If the unlocking setting module 12 stores the preset combination of N regions in the system, which are selected in order (i.e. the unlocking setting module 12 stores the region set sequence of the screen unlocking combination regions), then in the step 204, when the comparison module 14 compares the selected combination of the N regions in the system, it is necessary to determine whether the selected combination of the N regions are touched in order according to the preset sequence so as to be completely the same as the stored preset combination of N regions and the selected sequence (i.e. the comparison module 14 also performs comparison of the selected sequence of the user unlocking regions with the preset sequence.). If the comparison result is that the user unlocking regions and the screen unlocking combination regions are consistent, and the selected sequence of the user unlocking regions and the region setting sequence of the screen unlocking combination regions are also consistent, then the unlocking control module 15 unlocks the screen. If the comparison result is that the user unlocking regions and the screen unlocking combination regions are not consistent, or the selected sequence of the user unlocking regions and the region setting sequence of the screen unlocking combination regions are not consistent, then the unlocking error prompt module 16 prompts that unlocking is failed.

In the present embodiment, the positions which a finger touches sensed by a touch screen are compared with the preset combination of the N regions so as to unlock the screen. During the entire unlocking process, selection is only performed in the divided regions of the screen, thus it is not necessary to input a password by an input method for unlocking. Therefore, the screen unlocking security is improved. Furthermore, it provides convenience for the user that the screen is not easily inadvertently unlocked when touched by other objects.

In the screen unlocking method based on the mobile terminal, the step S202 further comprises:

Step S2021, setting N regions among M regions of the screen as the screen unlocking combination regions.

In the M regions of the screen, in accordance with finger touch positions sensed by the touch screen, the user selects the most convenient and effective combination of N regions as the screen unlocking combination regions. The user may select the combination of N regions according to a certain sequence of the selection, and also may randomly select any combination of N regions, and then the method enters step S2022.

Step S2022, storing the combination of N regions, which have been already preset for unlocking, in the system of the mobile terminal.

After presetting the combination of N regions according to the certain sequence or randomly in step S2021, it is correspondingly selected to store the same according to the certain sequence or in the same random manner in the system.

In the screen unlocking method based on the mobile terminal, when M is 25, step S201 specifically comprises:

pre-dividing the screen into 25 regions, and the 25 regions are configured into 5 rows from left to right, and 5 columns from top to bottom.

Figure 4:
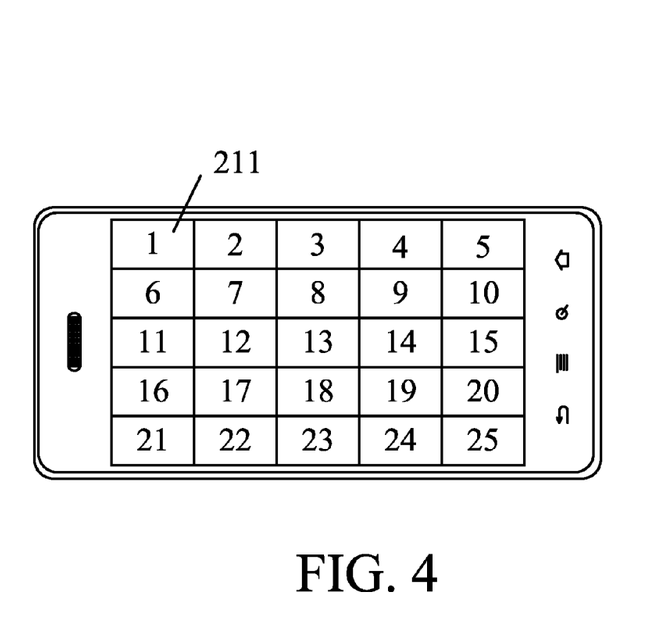
FIG. 4 is a schematic diagram of the dividing regions before setting an unlocking screen of the present invention.

FIG. 4 is a schematic diagram of the divided regions before setting an unlocking manner for the screen by the screen unlocking method based on the mobile terminal of the present invention. The user divides the screen of the mobile terminal into 25 regions in advance, then controls to arrange the 25 regions in order from left to right and from up to bottom according to the placing directions shown in FIG. 4.

In the screen unlocking method based on the mobile terminal, step S201 comprises:

dividing the mobile terminal screen into M regions. The M regions are controlled to be arranged consecutively from left to right into X rows, and from top to bottom into Y columns, wherein M=X*Y. The range of the value X is 2≤X≤5, the range of the value Y is 2≤Y≤5, and the values X and Y are respectively any set of integers selected within the ranges above. As shown in FIG. 4, in the X row and Y column directions, different values are selected from the given ranges, and therefore the manner that the screen is divided into M regions is not unique, which enable a user to have more options of setting a screen unlocking manner.

Figure 3:
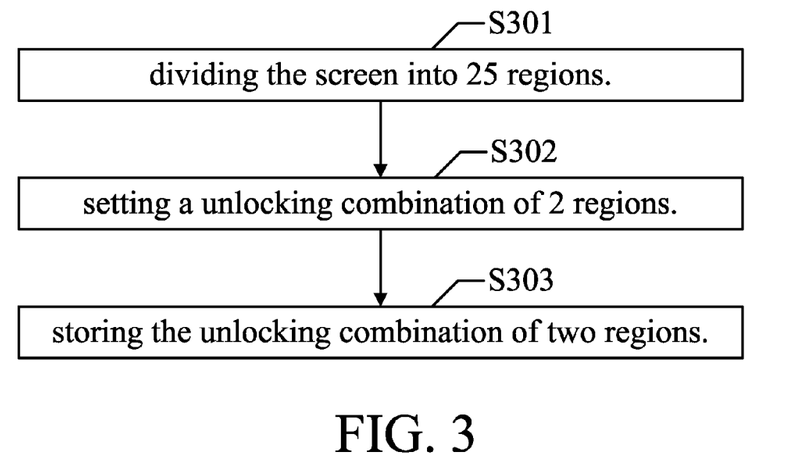
FIG. 3 is a flow chart of setting an unlocking screen in a preferred embodiment of the present invention.

FIG. 3 is a flow chart of a preferred embodiment of setting a screen unlocking manner by the screen unlocking method based on the mobile terminal of the present invention. The method of the present embodiment comprises the following steps:

Step S301, dividing the screen into 25 regions.

The user may select to set the screen to has the default 25 regions divided by the system, as shown in the upper left corner of FIG. 4. The first region 211 divided is one of the default 25 regions of the screen set by the system. Similarly, in the process of screen setting of the system, the user may also divide the screen into M regions in a self-defined manner, M=X*Y. The regions are divided into X regions in the horizontal direction (row direction), and are divided into Y regions in the vertical direction (column direction). The range of the value X is 2≤X≤5, the range of the value Y is 2≤Y≤5, and the values X and Y are any set of integers selected from the respective ranges above. Then the method enters the step S302.

Step S302, setting an unlocking combination of two regions.

Figure 5:
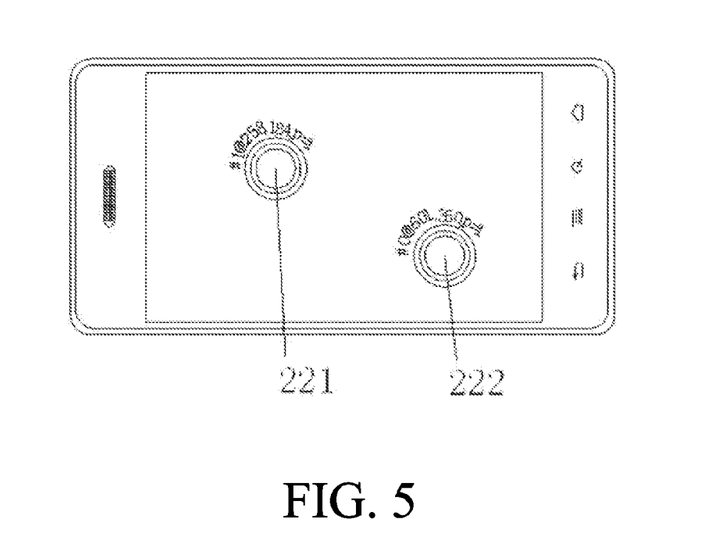
FIG. 5 is a schematic diagram for a combination of any two regions of the present invention.

N regions are set as the screen unlocking combination regions in the M regions of the screen, wherein N is an integers in a range of 2≤N<M. According to the above step S301, in the present embodiment, we set a combination of two regions of 25 regions of the screen as the screen unlocking combination regions. As shown in FIG. 5, which is a schematic diagram of the combination of any two regions in the screen unlocking method based on the mobile terminal of the present invention. Parameters relating to a particular coordinate of the selected region with respect to an origin of coordinate and the setting sequence of selection are shown above the selected region 221 on the left side of FIG. 5. Likewise, parameters relating to a particular coordinate of the selected region with respect to an origin of coordinate and the setting sequence of selection are also shown above the selected region 222 on the right side of FIG. 5. The three concentric circles shown in the diagram indicates an effective range of a selected region for determining whether the unlocking combination of N regions are touched during the user's unlocking process, then the method enters step S303.

Step S303, storing the unlocking combination of two regions.

The preset unlocking combination of N regions are stored into the system of the mobile terminal. According to the above description of S302, in present embodiment, the selected preset unlocking combination of two regions are stored into the system. (as show in FIG. 5), so as to achieve the setting process for unlocking the screen.

In this embodiment, before using the method of unlocking screen, the user performs presetting various schemes for unlocking the screen according to personal preferences or the user's habit. The screen is divided into M touch regions, and a combination of N valid regions with or without a sequence are set, and stored in the system. Since such unlocking setting solutions enable the user own the diversified selections, in actual operation process, more close to demand of the user's operation.

In the above described embodiment, in the screen unlocking method based on the mobile terminal, the mobile terminal screen is a coupling capacitive touch screen. When a finger touches the screen, the coupling capacitance is reduced, and the system can determine the location of the finger touch by detecting the amount of change in coupling capacitance. Therefore, in material selection for a larger smart phone screen, a touch screen made by the coupling capacitive material is used in the unlocking method of the present invention, so that the screen can be conveniently divided into a plurality of regions and different contact points are set, thereby enabling the system to more sensitively sense the operation condition of each region contact point.

Figure 6:
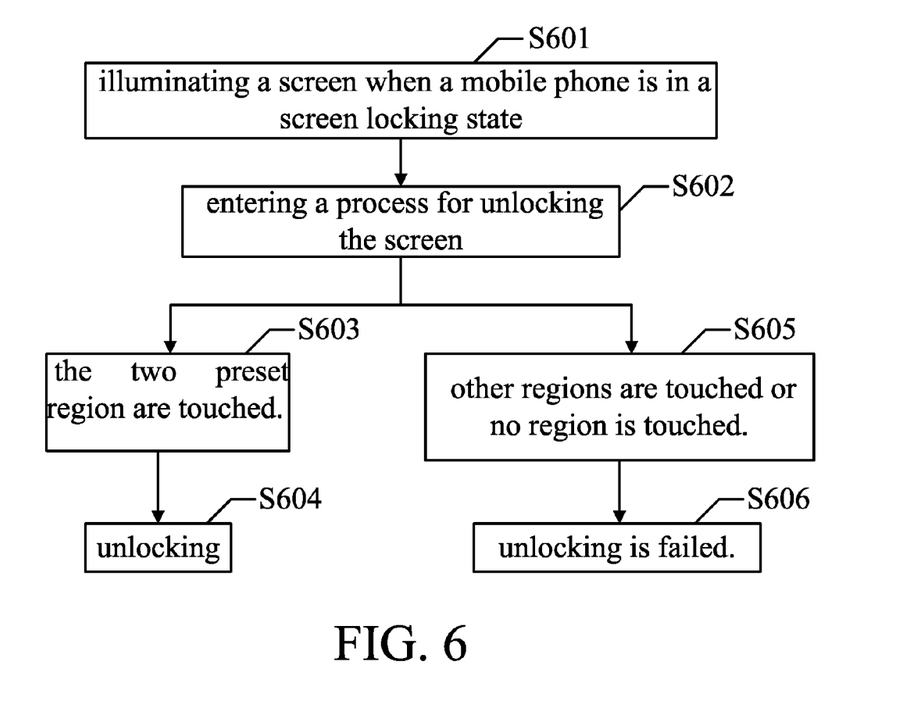
FIG. 6 is a flow chart of one embodiment of the present invention.

FIG. 6 is a flow chart of one embodiment of the screen unlocking method based on the mobile terminal of the present invention. The specific flow is:

Step S601, illuminating a screen when a mobile phone is in a screen locking state.

First, a user's mobile phone should be in the screen locking state. At this moment, the user first lights the screen, then the method enters step S602.

Step 602, entering a process for unlocking the screen.

When a user's mobile phone is illuminated and is still in a screen locking state, it begins to enter an unlocking screen operation interface. If the user selects any two regions of the screen to touch successively and respectively, then the method enters a determining process in S306. If the user touches a non-set region, or no region is touched after a certain time, then the method enters step S605.

In Step S603, the two preset region are touched.

In accordance with step S602, If any two regions, which are just the two preset regions, on the screen are selected by the user, then the method directly enters step S604.

Step S604, unlocking.

According to the above step S603, if the determination result conforms to the preset combination of regions, then the screen is unlocked.

Step S605, other regions are touched or no region is touched.

In accordance with the above step S602, if the user touches a region other than the preset unlocking regions or if no region is touched after a certain time, then the method enters step S606.

Step S606, unlocking is failed.

In accordance with the above step S605, if the determination result does not conform to the preset combination of regions, then the screen is not unlocked.

In this embodiment, by way of utilizing the screen unlocking method in practice, the present invention is both convenient and practical. Since such an unlocking method provides user great selectivity in the operation process, therefore it is suitable for the demands of the users themselves, and it provides more convenience in the user's operation.

For people of ordinary skilled in the art, it should be appreciated that for all or part of the process of the methods of the embodiments described above, which can be performed by way of computer instructions executed by related hardware, the instructions are stored in computer-readable storage medium. When the instructions are executed, the instructions comprise the process of the method of embodiments described above. Wherein, the storage medium comprises: magnetic discs, optical discs, read-only storage memory (ROM), or random access memory (RAM), etc.

In summary, the present invention relates to a screen unlocking method and system based on mobile terminal, and storage medium for the same. According to touch positions of a finger sensed by a touch screen, the screen of a mobile terminal is divided into M regions in advance; a combination of N regions are set in the divided regions as a screen unlocking combination regions. The divided M regions and the screen unlocking combination regions are self-defined parameters. Therefore, a user may set multiple unlocking combinations, so as to meet the personalized requirements of a user for unlocking a screen, avoiding incorrect touch screen unlocking operations, and preventing non-users from easily unlocking the screen, thereby preserving the user's personal interests, improving the screen unlocking security, and providing convenience for the user.

It should be appreciated that applications of the present invention are not limited to the above described examples. Modifications and transformations will occur to a person of ordinary skill in the art based on the above description; all such improvements and modifications are intended to be part of protection scope of the present invention, which is only limited by the claims appended hereto.

What is claimed is:

1. A screen unlocking method based on a mobile terminal comprising steps of:
   receiving a region dividing instruction, and dividing a screen into M regions according to the region dividing instruction, wherein M is an integer greater than 1;
   receiving a region setting instruction, setting N regions among the M regions of the screen as screen unlocking combination regions according to the region setting instruction, and storing the screen unlocking combination regions, wherein N is an integer greater than 0 and less than M, where the screen unlocking combination regions includes a region set sequence of the screen unlocking combination regions being not selected in order, a region set sequence of the screen unlocking combination regions being selected in order;
   receiving a user operation instruction, and selecting N regions of the screen as user unlocking regions according to the user operation instruction;
   comparing the user unlocking regions with the screen unlocking combination regions to obtain a comparison result; and
   executing an unlocking operation to the screen if the comparison result is that the user unlocking regions and the screen unlocking combination regions are consistent;
   wherein a region setting sequence for the screen unlocking combination regions is stored in the step of setting the N regions as the screen unlocking combination regions; the user unlocking regions are compared with the screen unlocking combination regions and a region selecting sequence of the user unlocking regions is compared with the region setting sequence to obtain the comparison result.

2. The screen unlocking method based on the mobile terminal according to claim 1, wherein the method further comprises a step of:
   prompting that unlocking is failed if the comparison result is that the user unlocking regions and the screen unlocking combination regions are inconsistent.

3. The screen unlocking method based on the mobile terminal according to claim 1, wherein the unlocking operation is executed if the comparison result is that the user unlocking regions and the screen unlocking combination regions are consistent, and the selecting sequence and the region setting sequence are also consistent.

4. The screen unlocking method based on the mobile terminal according to claim 1, wherein it is prompted that unlocking is failed if either the comparison result is that the user unlocking regions and the screen unlocking combination regions are inconsistent, or the selecting sequence and the region setting sequence are inconsistent.

5. The screen unlocking method based on the mobile terminal according to claim 1, wherein the step of receiving the region dividing instruction and the dividing the screen into the M regions according to the regions dividing instruction comprises:
   dividing the screen into the M regions, and the M regions being arranged into X rows and Y columns from left to right and from top to bottom; wherein $M = X * Y$, X and Y are integers greater than 1, respectively.

6. The screen unlocking method based on the mobile terminal according to claim 5, wherein the screen is divided into 25 regions when M is 25, and the 25 regions are arranged into 5 rows and 5 columns from left to right and from top to bottom.

7. The screen unlocking method based on the mobile terminal according to claim 1, wherein the step of receiving the user operation instruction and selecting the N regions of the screen as the user unlocking regions according to the user operation instruction comprise:
   selecting the latest selected N regions of the screen as the user unlocking regions if the user operation instruction is not received within a predetermined period.

8. A screen unlocking system based on a mobile terminal, comprising:
   a region dividing module for receiving an region dividing instruction and dividing a screen into M regions according to the region dividing instruction, wherein M is an integer and greater than 1;
   an unlocking setting module for receiving an region setting instruction, setting N regions in the M regions of the screen as the screen unlocking combination regions according to the region setting instruction, and storing the screen unlocking combination regions, wherein N is an integer greater than 0 and less than M, where the screen unlocking combination regions includes a region set sequence of the screen unlocking combination regions being not selected in order, a the region set sequence of the screen unlocking combination regions being selected in order;
   a receiving module for receiving a user operation instruction, and selecting N regions of the screen as a user unlocking regions according to the user operation instruction ;
   a comparison module for comparing the user unlocking regions with the screen unlocking combination regions to obtain a comparison result; and
   an unlocking control module for executing an unlocking operation to the screen if the comparison result is that the user unlocking regions and the screen unlocking combination regions are consistent;
   wherein the unlocking setting module for storing a region setting sequence of the screen unlocking combination regions; and the comparison module for comparing the user unlocking region with the screen unlocking combination regions, and comparing the selected sequence of the user unlocking regions with the region setting sequence to obtain the comparison result.

9. The screen unlocking system based on a mobile terminal according to claim 8, wherein the system further comprises:
an unlocking error prompt module for prompting that unlocking is failed if the comparison result is that the user unlocking region and the screen unlocking combination regions are inconsistent.

10. The screen unlocking system based on a mobile terminal according to claim 8, wherein the unlocking operation is executed if the comparison result is that the user unlocking regions and the screen unlocking combination regions are consistent, and the selecting sequence and the region setting sequence are consistent.

11. The screen unlocking system based on a mobile terminal according to claim 8, wherein the unlocking error prompt module is prompted that unlocking is failed if either the comparison result is that the user unlocking regions and the screen unlocking combination regions are inconsistent, or the selecting sequence and the region setting sequence are inconsistent.

12. The screen unlocking system based on a mobile terminal according to claim 8, wherein the region dividing module for dividing the screen into the M regions, and the M regions are arranged into X rows and Y columns from left to right and from top to bottom; wherein $M = X * Y$, X and Y are integers greater than 1 respectively.

13. The screen unlocking system based on a mobile terminal according to claim 12, wherein the region dividing module is divided the screen into 25 regions when M is 25, and the 25 regions are arranged into 5 rows and 5 columns from left to right and from top to bottom.

14. The screen unlocking system based on a mobile terminal according to claim 8, wherein the receiving module selects the latest selected N screen regions of the screen as the user unlocking regions according to the user operation instruction if the user operation instruction instruction is not received within a predetermined period.

15. A screen unlocking storage medium based on a mobile terminal, having stored thereon instructions being executed by a processor, the processor executing said instructions provides a method for unlocking a screen configured to a mobile terminal, comprising:
receiving an region dividing instruction, and dividing a screen into M regions according to the region dividing instruction, wherein M is an integer greater than 1;
receiving an region setting instruction, and setting N regions among the M regions of the screen as the screen unlocking combination regions according to the region setting instruction, and storing the screen unlocking combination regions, wherein N is an integer greater than 0 and less than M, where the screen unlocking combination regions includes a region set sequence of the screen unlocking combination regions being not selected in order, and a region set sequence of the screen unlocking combination regions being selected in order;
receiving a user operation instruction, and selecting N regions of the screen as a user unlocking regions according to the user operation instruction;
comparing the user unlocking regions with the screen unlocking combination regions to obtain a comparison result; and
executing an unlocking operation to the screen if the comparison result is that the user unlocking regions and the screen unlocking combination regions are consistent.

* * * * *